US011935552B2

(12) United States Patent
Uhlich et al.

(10) Patent No.: US 11,935,552 B2
(45) Date of Patent: Mar. 19, 2024

(54) ELECTRONIC DEVICE, METHOD AND COMPUTER PROGRAM

(71) Applicant: Sony Group Corporation, Tokyo (JP)

(72) Inventors: Stefan Uhlich, Stuttgart (DE); Michael Enenkl, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 226 days.

(21) Appl. No.: 17/423,489

(22) PCT Filed: Jan. 23, 2020

(86) PCT No.: PCT/EP2020/051618
§ 371 (c)(1),
(2) Date: Jul. 16, 2021

(87) PCT Pub. No.: WO2020/152264
PCT Pub. Date: Jul. 30, 2020

(65) Prior Publication Data

US 2022/0076687 A1 Mar. 10, 2022

(30) Foreign Application Priority Data

Jan. 23, 2019 (EP) .................................... 19153334

(51) Int. Cl.
*G10L 21/028* (2013.01)
*G10H 1/00* (2006.01)
*G10L 25/51* (2013.01)

(52) U.S. Cl.
CPC ......... *G10L 21/028* (2013.01); *G10H 1/0008* (2013.01); *G10L 25/51* (2013.01); *G10H 2210/071* (2013.01)

(58) Field of Classification Search
CPC ...... G10H 1/00; G10H 1/0008; G10H 1/0091; G10H 2210/071; G10L 19/025; G10L 21/0272; G10L 21/028; G10L 25/48; G10L 25/51; H04R 3/005
USPC ........................................................... 381/56
See application file for complete search history.

(56) References Cited

U.S. PATENT DOCUMENTS

2012/0294459 A1 11/2012 Chapman et al.
2014/0297012 A1 10/2014 Kobayashi
2016/0329061 A1 11/2016 Heber et al.
2018/0047372 A1 2/2018 Scallie et al.
(Continued)

FOREIGN PATENT DOCUMENTS

WO 2015/150066 A1 10/2015

OTHER PUBLICATIONS

International Search Report and Written Opinion dated Feb. 21, 2020, received for PCT Application PCT/EP2020/051618, Filed on Jan. 23, 2020, 10 pages.
(Continued)

*Primary Examiner* — Harry S Hong
(74) *Attorney, Agent, or Firm* — XSENSUS LLP

(57) ABSTRACT

An electronic device comprising circuitry configured to perform (402; 702; 1204) source separation (201) based on a received audio input to obtain a separated source, to perform onset detection (202) on the separated source to obtain an onset detection signal and to mix (405; 706; 1207) the audio signal with the separated source based on the onset detection signal to obtain an enhanced separated source.

20 Claims, 12 Drawing Sheets

(56) References Cited

U.S. PATENT DOCUMENTS

| | | | |
|---|---|---|---|
| 2018/0088899 A1 | 3/2018 | Gillespie et al. | |
| 2018/0176706 A1* | 6/2018 | Cardinaux | G10L 21/0272 |

OTHER PUBLICATIONS

Gillet et al., "Extraction and Remixing of Drum Tracks From Polyphonic Music Signals", IEEE Workshop on Applications of Signal Processing to Audio and Acoustics, Oct. 16-19, 2005, pp. 315-318.

Dittmar, "Source Separation and Restoration of Drum Sounds in Music Recordings", Jun. 14, 2018, pp. 1-181.

* cited by examiner d)

| | Low | Middle | High |
|---|---|---|---|
| B | +5dB | -5dB | -5dB |
| H | -5dB | -5dB | +5dB |
| S | -5dB | +5dB | +5dB |

a)

b)

ELECTRONIC DEVICE, METHOD AND COMPUTER PROGRAM

CROSS-REFERENCE TO RELATED APPLICATIONS

The present application is based on PCT filing PCT/EP2020/051618, filed Jan. 23, 2020, which claims priority to EP 19153334.8, filed Jan. 23, 2019, the entire contents of each are incorporated herein by reference.

TECHNICAL FIELD

The present disclosure generally pertains to the field of audio processing, in particular to devices, methods and computer programs for source separation and mixing.

TECHNICAL BACKGROUND

There is a lot of audio content available, for example, in the form of compact disks (CD), tapes, audio data files which can be downloaded from the internet, but also in the form of sound tracks of videos, e.g. stored on a digital video disk or the like, etc. Typically, audio content is already mixed, e.g. for a mono or stereo setting without keeping original audio source signals from the original audio sources which have been used for production of the audio content. However, there exist situations or applications where a mixing of the audio content is envisaged.

Although there generally exist techniques for mixing audio content, it is generally desirable to improve devices and methods for mixing of audio content.

SUMMARY

According to a first aspect, the disclosure provides an electronic device comprising circuitry configured to perform source separation based on a received audio input to obtain a separated source, to perform onset detection on the separated source to obtain an onset detection signal and to mix the audio signal with the separated source based on the onset detection signal to obtain an enhanced separated source.

According to a second aspect, the disclosure provides a method comprising: performing source separation based on a received audio input to obtain a separated source; performing onset detection on the separated source to obtain an onset detection signal; and mixing the audio signal with the separated source based on the onset detection signal to obtain an enhanced separated source.

According to a third aspect, the disclosure provides a computer program comprising instructions, the instructions when executed on a processor causing the processor to perform source separation based on a received audio input to obtain a separated source, to perform onset detection on the separated source to obtain an onset detection signal and to mix the audio signal with the separated source based on the onset detection signal to obtain an enhanced separated source.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
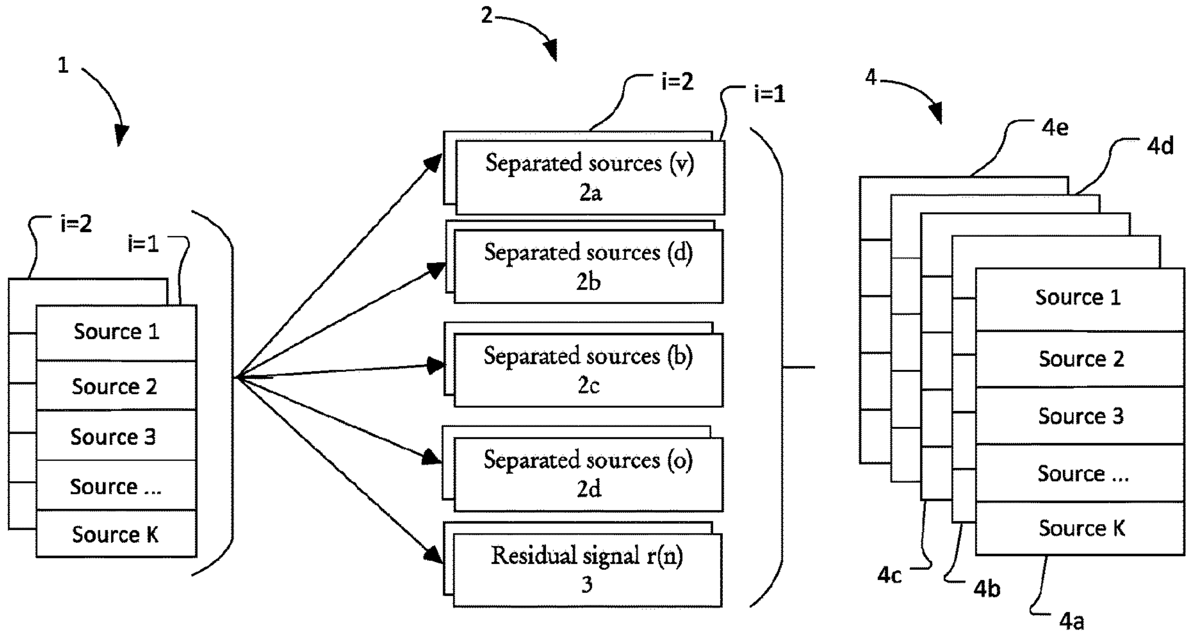
FIG. 1 schematically shows a general approach of audio upmixing/remixing by means of blind source separation (BSS)

Before a detailed description of the embodiments under reference of FIGS. 1 to 12, general explanations are made.

The embodiments disclose an electronic device comprising circuitry configured to perform source separation based on a received audio input to obtain a separated source, to perform onset detection on the separated source to obtain an onset detection signal and to mix the audio signal with the separated source based on the onset detection signal to obtain an enhanced separated source.

The circuitry of the electronic device may include a processor, may for example be CPU, a memory (RAM, ROM or the like), a memory and/or storage, interfaces, etc. Circuitry may comprise or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, circuitry may comprise or may be connected with sensors for sensing still images or video image data (image sensor, camera sensor, video sensor, etc.), for sensing environmental parameters (e.g. radar, humidity, light, temperature), etc.

In audio source separation, an input signal comprising a number of sources (e.g. instruments, voices, or the like) is decomposed into separations. Audio source separation may be unsupervised (called "blind source separation", BSS) or partly supervised. "Blind" means that the blind source separation does not necessarily have information about the original sources. For example, it may not necessarily know how many sources the original signal contained or which sound information of the input signal belong to which original source. The aim of blind source separation is to decompose the original signal separations without knowing the separations before. A blind source separation unit may use any of the blind source separation techniques known to the skilled person. In (blind) source separation, source signals may be searched that are minimally correlated or maximally independent in a probabilistic or information-theoretic sense or on the basis of a non-negative matrix factorization structural constraints on the audio source signals can be found. Methods for performing (blind) source separation are known to the skilled person and are based on, for example, principal components analysis, singular value decomposition, (in)dependent component analysis, non-negative matrix factorization, artificial neural networks, etc.

Although some embodiments use blind source separation for generating the separated audio source signals, the present disclosure is not limited to embodiments where no further information is used for the separation of the audio source signals, but in some embodiments, further information is used for generation of separated audio source signals. Such further information can be, for example, information about the mixing process, information about the type of audio sources included in the input audio content, information about a spatial position of audio sources included in the input audio content, etc.

The input signal can be an audio signal of any type. It can be in the form of analog signals, digital signals, it can origin from a compact disk, digital video disk, or the like, it can be a data file, such as a wave file, mp3-file or the like, and the present disclosure is not limited to a specific format of the input audio content. An input audio content may for example be a stereo audio signal having a first channel input audio signal and a second channel input audio signal, without that the present disclosure is limited to input audio contents with two audio channels. In other embodiments, the input audio content may include any number of channels, such as remixing of an 5.1 audio signal or the like. The input signal may comprise one or more source signals. In particular, the input signal may comprise several audio sources. An audio source can be any entity, which produces sound waves, for example, music instruments, voice, vocals, artificial generated sound, e.g. origin form a synthesizer, etc.

The input audio content may represent or include mixed audio sources, which means that the sound information is not separately available for all audio sources of the input audio content, but that the sound information for different audio sources, e.g., at least partially overlaps or is mixed.

The separations produced by blind source separation from the input signal may for example comprise a vocals separation, a bass separation, a drums separations and another separation. In the vocals separation all sounds belonging to human voices might be included, in the bass separation all noises below a predefined threshold frequency might be included, in the drums separation all noises belonging to the drums in a song/piece of music might be included and in the other separation, all remaining sounds might be included. Source separation obtained by a Music Source Separation (MSS) system may result in artefacts such as interference, crosstalk or noise.

Onset detection may be for example time-domain manipulation, which may be performed on a separated source selected from the source separation to obtain an onset detection signal. Onset may refer to the beginning of a musical note or other sound. It may be related to (but different from) the concept of a transient: all musical notes have an onset, but do not necessarily include an initial transient.

Onset detection is an active research area. For example, the MIREX annual competition features an Audio Onset Detection contest. Approaches to onset detection may operate in the time domain, frequency domain, phase domain, or complex domain, and may include looking for increases in spectral energy, changes in spectral energy distribution (spectral flux) or phase, changes in detected pitch —e.g. using a polyphonic pitch detection algorithm, spectral patterns recognizable by machine learning techniques such as neural networks, or the like. Alternatively, simpler techniques may exist, for example detecting increases in time-domain amplitude may lead to an unsatisfactorily high amount of false positives or false negatives, or the like.

The onset detection signal may indicate the attack phase of a sound (e.g. bass, hi-hat, snare), here the drums. As the analysis of the separated source may need some time, the onset detection may detect the onset later than it really is. That is, there may be an expected latency $\Delta t$ of the onset detection signal. The expected time delay $\Delta t$ may be a known, predefined parameter, which may be set in the latency compensation as a predefined parameter.

The circuitry may be configured to mix the audio signal with the separated source based on the onset detection signal to obtain an enhanced separated source. The mixing may be configured to perform mixing of one (e.g. drums separation) of the separated sources, here vocals, bass, drums and other to produce an enhanced separated source. Performing mixing based on the onset detection may enhance the separated source.

In some embodiments the circuitry may be further configured to perform latency compensation based on the received audio input to obtain a latency compensated audio signal and to perform latency compensation on the separated source on the separated source to obtain a latency compensated separated source.

In some embodiments the mixing of the audio signal with the separated source based on the onset detection signal may comprise mixing the latency compensated audio signal with the latency compensated separated source.

In some embodiments the circuitry may be further configured to generate a gain $g_{DNN}$ to be applied to the latency compensated separated source based on the onset detection signal and to generate a gain $g_{Original}$ to be applied to the latency compensated audio signal based on the onset detection signal.

In some embodiments the circuitry may be further configured to generate a gain modified latency compensated separated source based on the latency compensated separated source and to generate a gain modified latency compensated audio signal based on the latency compensated audio signal.

In some embodiments performing latency compensation on the separated source may comprise delaying the separated source by an expected latency in the onset detection.

In some embodiments performing latency compensation on the received audio input may comprise delaying the received audio input by an expected latency in the onset detection.

In some embodiments the circuitry may be further configured to perform an envelope enhancement on the latency compensated separated source to obtain an envelope enhanced separated source. This envelope enhancement may for example be any kind of gain envelope generator with attack, sustain and release parameters as known from the state of the art.

In some embodiments the mixing of the audio signal with the separated source may comprise mixing the latency compensated audio signal to the envelope enhanced separated source.

In some embodiments the circuitry may be further configured to perform averaging on the latency compensated audio signal to obtain an average audio signal.

In some embodiments the circuitry may be further configured to perform a rhythm analysis on the average audio signal to obtain a rhythm analysis result.

In some embodiments the circuitry may be further configured to perform dynamic equalization on the latency compensated audio signal and on the rhythm analysis result to obtain a dynamic equalized audio signal.

In some embodiments the mixing of the audio signal to the separated source comprises mixing the dynamic equalized audio signal with the latency compensated separated source.

The embodiments also disclose a method comprising: performing source separation based on a received audio input to obtain a separated source; performing onset detection on the separated source to obtain an onset detection signal; and mixing the audio signal with the separated source based on the onset detection signal to obtain an enhanced separated source.

According to a further aspect, the disclosure provides a computer program comprising instructions, the instructions when executed on a processor causing the processor to perform source separation based on a received audio input to obtain a separated source, to perform onset detection on the separated source to obtain an onset detection signal and to mix the audio signal with the separated source based on the onset detection signal to obtain an enhanced separated source.

Embodiments are now described by reference to the drawings.

FIG. 1 schematically shows a general approach of audio upmixing/remixing by means of blind source separation (BSS).

First, source separation (also called "demixing") is performed which decomposes a source audio signal 1 comprising multiple channels I and audio from multiple audio sources Source 1, Source 2, . . . Source K (e.g. instruments, voice, etc.) into "separations", here into source estimates 2*a*-2*d* for each channel i, wherein K is an integer number and denotes the number of audio sources. In the embodiment here, the source audio signal 1 is a stereo signal having two channels i=1 and i=2. As the separation of the audio source signal may be imperfect, for example, due to the mixing of the audio sources, a residual signal 3 (r(n)) is generated in addition to the separated audio source signals 2*a*-2*d*. The residual signal may for example represent a difference between the input audio content and the sum of all separated audio source signals. The audio signal emitted by each audio source is represented in the input audio content 1 by its respective recorded sound waves. For input audio content having more than one audio channel, such as stereo or surround sound input audio content, also a spatial information for the audio sources is typically included or represented by the input audio content, e.g. by the proportion of the audio source signal included in the different audio channels. The separation of the input audio content 1 into separated audio source signals 2*a*-2*d* and a residual 3 is performed on the basis of blind source separation or other techniques which are able to separate audio sources.

In a second step, the separations 2*a*-2*d* and the possible residual 3 are remixed and rendered to a new loudspeaker signal 4, here a signal comprising five channels 4*a*-4*e*, namely a 5.0 channel system. On the basis of the separated audio source signals and the residual signal, an output audio content is generated by mixing the separated audio source signals and the residual signal on the basis of spatial information. The output audio content is exemplary illustrated and denoted with reference number 4 in FIG. 1.

In the following, the number of audio channels of the input audio content is referred to as $M_{in}$ and the number of audio channels of the output audio content is referred to as $M_{out}$ As the input audio content 1 in the example of FIG. 1 has two channels i=1 and i=2 and the output audio content 4 in the example of FIG. 1 has five channels 4*a*-4*e*, $M_{in}=2$ and $M_{out}=5$. The approach in FIG. 1 is generally referred to as remixing, and in particular as upmixing if $M_{in}<M_{out}$. In the example of the FIG. 1 the number of audio channels $M_{in}=2$ of the input audio content 1 is smaller than the number of audio channels $M_{out}=5$ of the output audio content 4, which is, thus, an upmixing from the stereo input audio content 1 to 5.0 surround sound output audio content 4.

Figure 2:
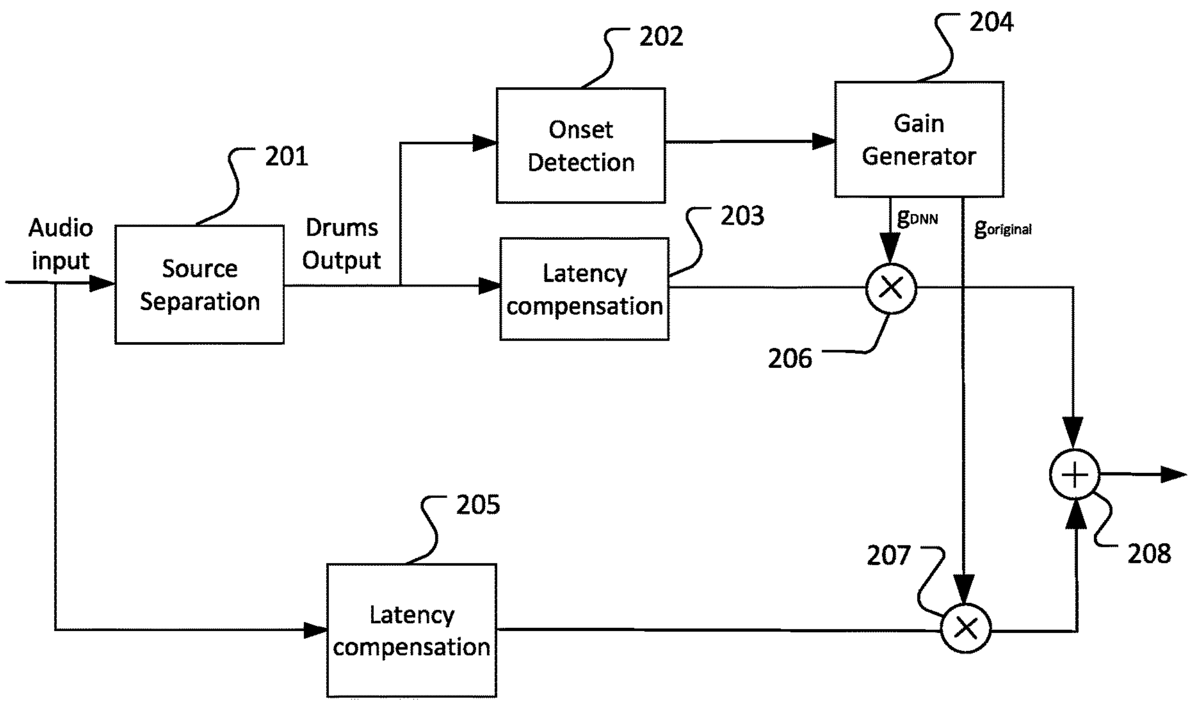
FIG. 2 schematically shows a process of enhancing a separated source obtained by source separation based on an onset detection.

FIG. 2 schematically shows a process of enhancing a separated source obtained by source separation based on an onset detection. The process comprises a source separation 201, an onset detection 202, a latency compensation 203, a gain generator 204, a latency compensation 205, an amplifier 206, an amplifier 207, and a mixer 208. An audio input signal (see input signal 1 in FIG. 1) containing multiple sources (see Source 1, 2, . . . K in FIG. 1), with multiple channels (e.g. $M_{in}=2$), is input to the source separation 201 and decomposed into separations (see separated sources 2*a*-2*d* in FIG. 1) as it is described with regard to FIG. 1 above, and one of the separations is selected, here the drums separation (drums output). The selected separated source (see separated signal 2 in FIG. 1), here drums separation, is transmitted to the onset detection 202. At the onset detection 202, the separated source is analyzed to produce an onset detection signal (see "Onset" in FIG. 3). The onset detection signal indicates the attack phase of a sound (e.g. bass, hi-hat, snare), here the drums. As the analysis of the separated source needs some time, the onset detection 202 will detect the onset later than it really is. That is, there is an expected latency Δt of the onset detection signal. The expected time delay Δt is a known, predefined parameter, which may be set in the latency compensation 203 and 205 as a predefined parameter.

The separated source obtained during source separation 201, here the drums separation, is also transmitted to the latency compensation 203. At the latency compensation 203, the drums separation is delayed by the expected latency Δt of the onset detection signal to generate a latency compensated drums separation. This has the effect that the latency Δt of the onset detection signal is compensated by a respective delay of the drums separation. Simultaneously with the source separation 201, the audio input is transmitted to the latency compensation 205. At the latency compensation 205, the audio input is delayed by the expected latency Δt of the onset detection signal to generate a latency compensated audio signal. This has the effect that the latency Δt of the onset detection signal is compensated by a respective delay of the audio input.

The gain generator 204 is configured to generate a gain $g_{DNN}$ to be applied to the latency compensated separated source and a gain $g_{Original}$ to be applied on the latency compensated audio signal based on the onset detection signal. The function of the gain generator 204 will be described in more detail in FIG. 3. The amplifier 206 generates, based on the latency compensated drums separation and based on the gain $g_{DNN}$ generated by the gain generator, a gain modified latency compensated drums separation. The amplifier 207 generates, based on the latency compensated audio signal and based on the gain $g_{Original}$ generated by the gain generator, a gain modified latency compensated audio signal. The mixer 208 mixes the gain modified latency compensated audio signal to the gain modified latency compensated drums separation to obtain an enhanced drums separation.

The present invention is not limited to this example. The source separation 201 could output also other separated sources, e.g. vocals separation, bass separation, other separation, or the like. Although in FIG. 2 only one separated source (here the drums separation) is enhanced by onset detection, multiple of the separated sources can be enhanced by the same process. The enhanced separated sources may for example be used in remixing/upmixing (see right side of FIG. 1).

Figure 3:
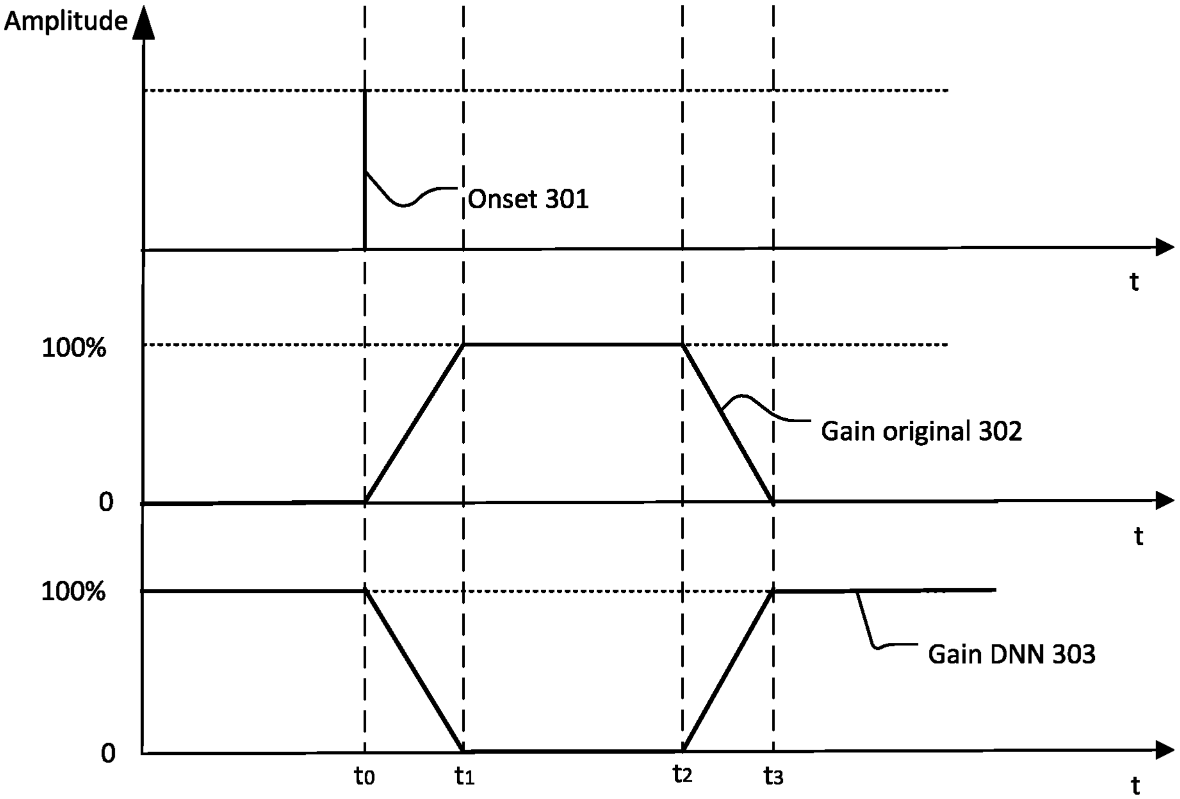
FIG. 3 schematically illustrates in diagram the onset detection signal and the gains $g_{DNN}$ and $g_{Original}$ to be applied to the latency compensated separated source and, respectively, to the latency compensated audio signal based on the onset detection signal.

FIG. 3 schematically illustrates in diagram the onset detection signal and the gains $g_{DNN}$ and $g_{Original}$ to be applied to the latency compensated separated source and, respectively, to the latency compensated audio signal based on the onset detection signal. The onset detection signal is displayed in the upper part of FIG. 3. The onset detection signal, according to this embodiment, is a binary signal, which indicates the start of a sound. Any state of the art onset detection algorithm known to the skilled person, which runs on the separated output (e.g. the drums separation) of the source separation (201 in FIG. 2), can be used to gain insight of the correct onset start of an "instrument". For example, Collins, N. (2005) "A Comparison of Sound Onset Detection Algorithms with Emphasis on Psychoacoustically Motivated Detection Functions", Proceedings of AES118 Convention, describes such onset detection algorithms. In particular the onset indicates the attack phase of a sound (e.g. bass, hi-hat, snare), here the drums. The onset detection signal is used as a trigger signal to start changes in the gains $g_{DNN}$ and $g_{Original}$ as displayed in the middle and lower part of FIG. 3. In the middle and lower part of FIG. 3 the gains $g_{DNN}$ and $g_{Original}$ according to an embodiment are described in more detail. The abscissa displays the time and the ordinate the value of the respective gain $g_{DNN}$ and $g_{Original}$ in the interval 0 to 100%. In FIG. 3, the horizontal dashed lines represent the maximum value of the amplitude and the vertical dashed lines represent the time instances $t_0$, $t_1$, $t_2$, $t_3$. The gains $g_{DNN}$ and gorier modify the latency compensated separated source and the latency compensated audio signal respectively. That is, the gain generator 204 has the function of a "gate", which "opens" for a predefined time Δt before the "real" onset.

In the middle part of FIG. 3, the gain $g_{Original}$ is applied to the latency compensated audio signal based on the onset detection signal. In particular, the gain $g_{Original}$ is set to 0 before time $t_0$, i.e. before the detection of the onset. Accordingly, there is no mixing of the original audio signal to the separated source in this phase. During the time interval $t_0$ to $t_1$ the gain $g_{Original}$ is increased linearly from 0 to 100% ("attack phase"). That is, progressively more of the original audio signal is mixed to the separated source. During the time interval $t_1$ to $t_2$ ("sustain phase") the gain $g_{Original}$ is set to 100% of the latency compensated audio signal. During the time interval $t_2$ to $t_3$ the gain $g_{Original}$ is decreased linearly from 100% to 0 ("release phase"). That is, progressively less of the original audio signal is mixed to the separated source.

In the lower part of FIG. 3, the gain $g_{DNN}$ is applied to the latency compensated separated source based on the onset detection signal. In particular, the gain $g_{DNN}$ is set to 100% before time $t_0$, i.e. before the detection of the onset. Accordingly, in this phase the separated source passes the gate without any modification. During the time interval $t_0$ to $t_1$ the gain $g_{DNN}$ is decreased linearly from 100% to 0 (reversed "attack phase"). That is, progressively less of the separated source passes the gate. During the time interval $t_1$ to $t_2$ ("sustain phase") the gain $g_{DNN}$ is set to 0 of the latency compensated separated source. During this phase, the separated source is replace entirely by the original audio signal. During the time interval $t_2$ to $t_3$ the gain $g_{DNN}$ is increased linearly from 0 to 100% (reverse "release phase"). That is, progressively more of the separated source passes the gate.

Based on these gains $g_{DNN}$ and $g_{Original}$ the amplifiers and the mixer (206, 207, and 208 in FIG. 2) generates the enhanced separated source as described with regard to FIG. 2 above. The above described process will create a separation with the correct onset, by sacrificing the crosstalk, as it lets the other instruments come through during the transition phase. In the embodiment of FIG. 3, the gains $g_{DNN}$ and $g_{Original}$ are chosen so that the original audio signal is mixed to the separated source in such a way that the overall energy of the system remains the same. The skilled person may however choose $g_{DNN}$ and $g_{Original}$ in other ways according to the needs of the specific use case.

The length of the attack phase $t_0$ to $t_1$, the sustain phase $t_1$ to $t_2$, and the release phase $t_2$ to $t_3$ is set by the skilled person as a predefined parameter according to the specific requirements of the instrument at issue.

Figure 4:
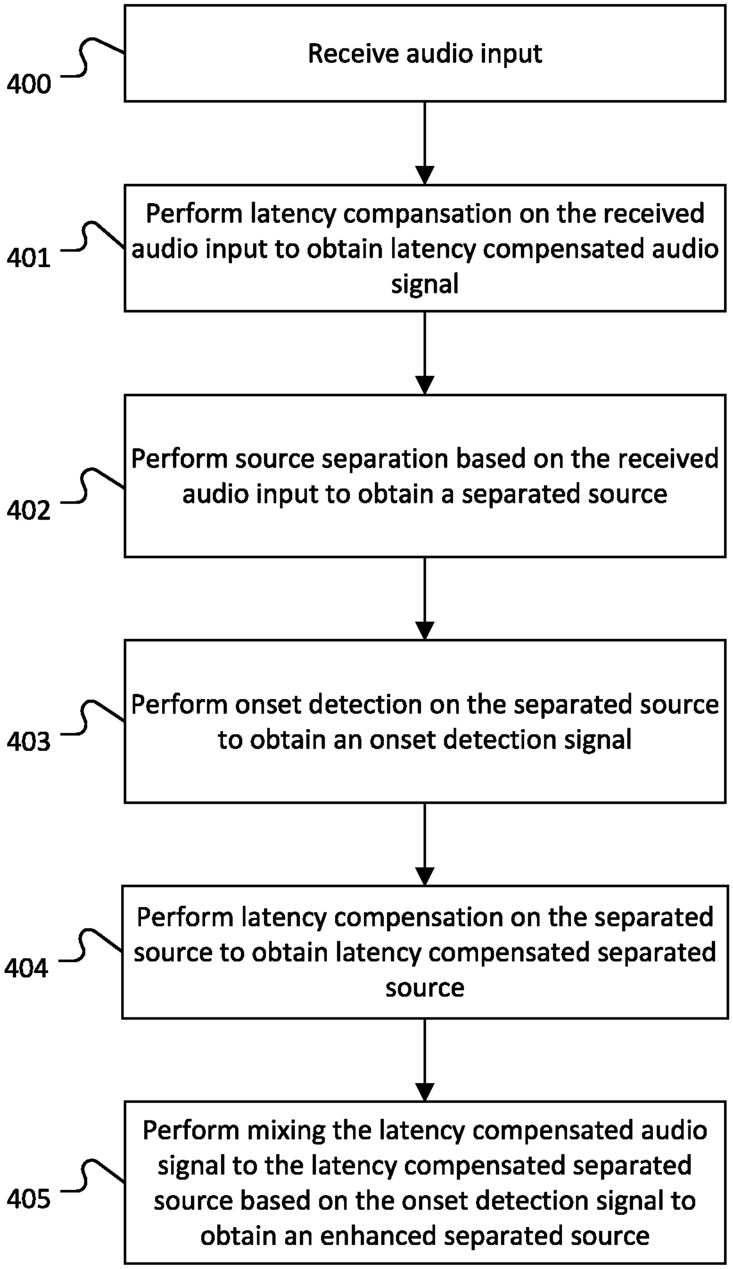
FIG. 4 shows a flow diagram visualizing a method for signal mixing based on an onset detection signal in order to obtain an enhanced separated source.

FIG. 4 shows a flow diagram visualizing a method for signal mixing based on an onset detection signal in order to obtain an enhanced separated source. At 400, the source separation 201 (see FIG. 2) receives an audio input. At 401, latency compensation 205 is performed on the received audio input to obtain a latency compensated audio signal (see FIG. 2). At 402, source separation 201 is performed based on the received audio input to obtain a separated source (see FIG. 2). At 403, onset detection 202 is performed on the separated source, for example drums separation, to obtain an onset detection signal. At 404, latency compensation 203 is performed on the separated source to obtain a latency compensated separated source (see FIG. 2). At 405, mixing is performed of the latency compensated audio signal to the latency compensated separated source based on the onset detection signal to obtain an enhanced separated source (see FIG. 2).

Figure 5:
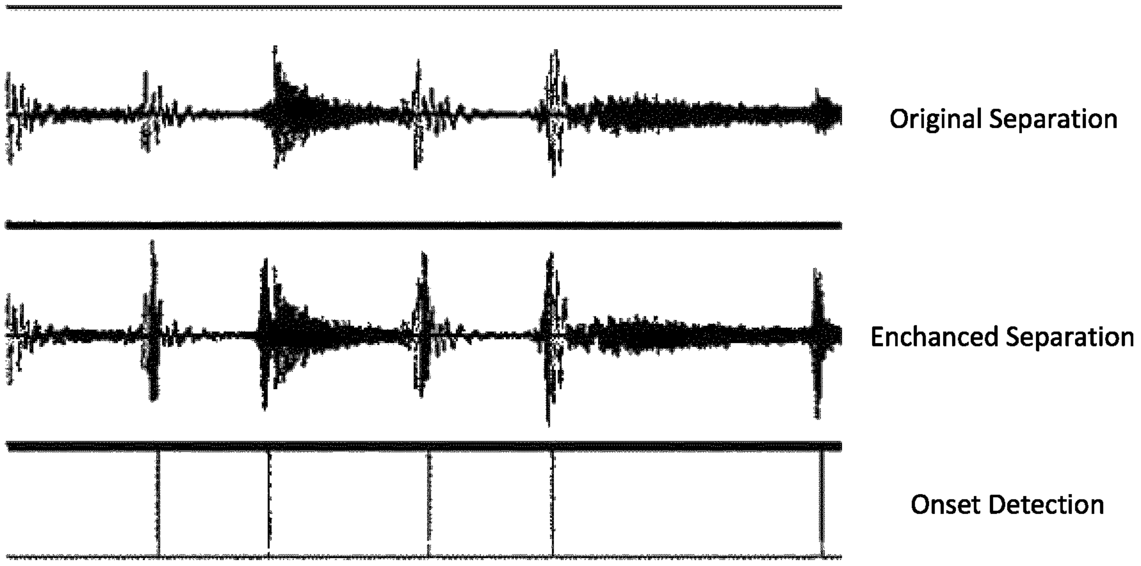
FIG. 5 schematically illustrates an example of an original separation signal, an enhanced separation signal and an onset detection.

FIG. 5 schematically illustrates an example of an original separation signal, an enhanced separation signal and an onset detection. As can be taken from FIG. 5 comparing the original separation with the enhanced separation, the signal of the original separation has lower amplitudes than the enhanced separation signal at the onset detection time which is the result of performing mixing the latency compensated audio signal to the latency compensated separated source based on the onset detection signal to obtain an enhanced separated source, as described in detail in FIG. 2 and in FIG.

4. Consequently, this process results to an improved sonic quality of the separated source signal and fine-tunes the system to best sonic quality.

Figure 6:
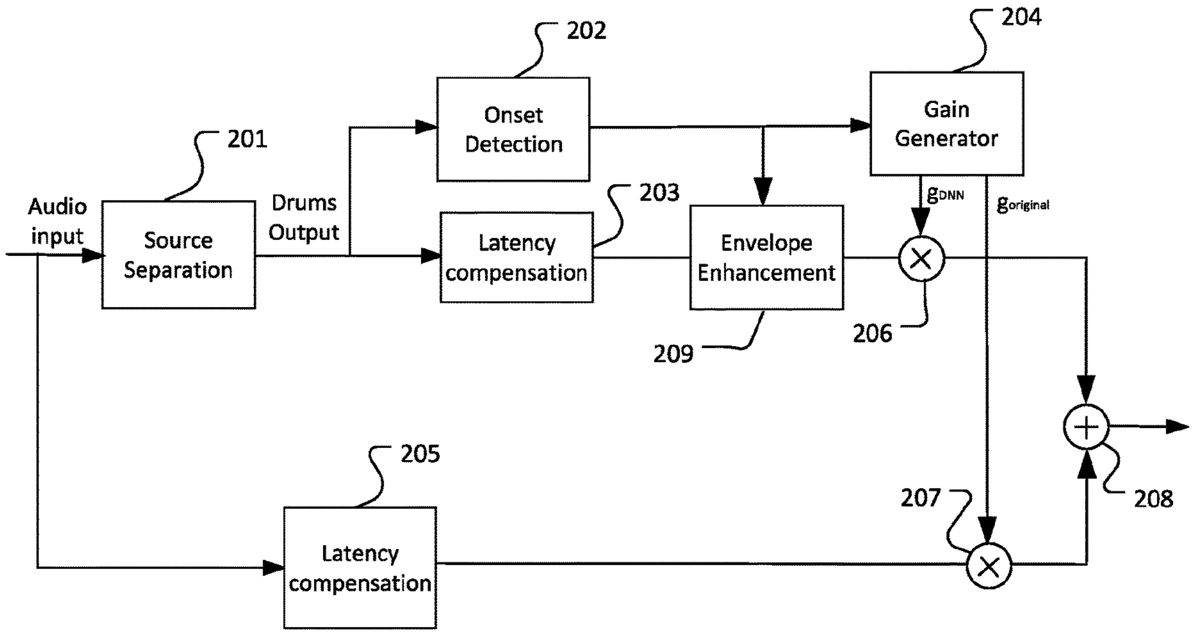
FIG. 6 schematically shows a process of enhancing a separated source obtained by source separation based on an onset detection and an envelope enhancement.

FIG. 6 schematically shows a process of enhancing a separated source obtained by source separation based on an onset detection and an envelope enhancement. The process comprises a source separation 201, an onset detection 202, a latency compensation 203, a gain generator 204, a latency compensation 205, an amplifier 206, an amplifier 207, a mixer 208 and an envelope enhancement 209. An audio input signal (see input signal 1 in FIG. 1) containing multiple sources (see Source 1, 2, . . . K in FIG. 1), with multiple channels (e.g. $M_{in}$=2), is input to the source separation 201 and decomposed into separations (see separated sources 2*a*-2*d* in FIG. 1) as it is described with regard to FIG. 1 above, and one of the separations is selected, here the drums separation (drums output). The selected separated source (see separated signal 2 in FIG. 1), here drums separation, is transmitted to the onset detection 202. At the onset detection 202, the separated source is analyzed to produce an onset detection signal (see "Onset" in FIG. 3). The onset detection signal indicates the attack phase of a sound (e.g. bass, hi-hat, snare), here the drums. As the analysis of the separated source needs some time, the onset detection 202 will detect the onset later than it really is. That is, there is an expected latency Δt of the onset detection signal. The expected time delay Δt is a known, predefined parameter, which may be set in the latency compensation 203 and 205 as a predefined parameter.

The separated source obtained during source separation 201, here the drums separation, is also transmitted to the latency compensation 203. At the latency compensation 203, the drums separation is delayed by the expected latency Δt of the onset detection signal to generate a latency compensated drums separation. This has the effect that the latency Δt of the onset detection signal is compensated by a respective delay of the drums separation. The latency compensated drums separation obtained during latency compensation 203 is transmitted to the envelope enhancement 209. At the envelope enhancement 209, the latency enhanced separated source, here the drums separation is further enhanced based on the onset detection signal, obtained from the onset detection 202, to generate an envelope enhanced separated source, here drums separation. The envelope enhancement 209 further enhances the attack of e.g. the drums separation and further enhance the energy of the onset by applying envelope enhancement to the drums output (original DNN output). This envelope enhancement 209 can for example be any kind of gain envelope generator with attack, sustain and release parameters as known from the state of the art.

Simultaneously with the source separation 201, the audio input is transmitted to the latency compensation 205. At the latency compensation 205, the audio input is delayed by the expected latency Δt of the onset detection signal to generate a latency compensated audio signal. This has the effect that the latency Δt of the onset detection signal is compensated by a respective delay of the audio input.

The gain generator 204 is configured to generate a gain $g_{DNN}$ to be applied to the onset enhanced separated source and a gain $g_{Original}$ to be applied on the latency compensated audio signal based on the onset detection signal. The function of the gain generator 204 described in more detail in FIG. 3. The amplifier 206 generates, based on the envelope enhanced drums separation and based on the gain $g_{DNN}$ generated by the gain generator, a gain modified envelope enhanced drums separation. The amplifier 207 generates, based on the latency compensated audio signal and based on the gain $g_{Original}$ generated by the gain generator, a gain modified latency compensated audio signal. The mixer 208 mixes the gain modified latency compensated audio signal to the gain modified envelope enhanced drums separation to obtain an enhanced drums separation.

The present invention is not limited to this example. The source separation 201 could output also other separated sources, e.g. vocals separation, bass separation, other separation, or the like. Although in FIG. 2 only one separated source (here the drums separation) is enhanced by onset detection, multiple of the separated sources can be enhanced by the same process. The enhanced separated sources may for example be used in remixing/upmixing (see right side of FIG. 1).

Figure 7:
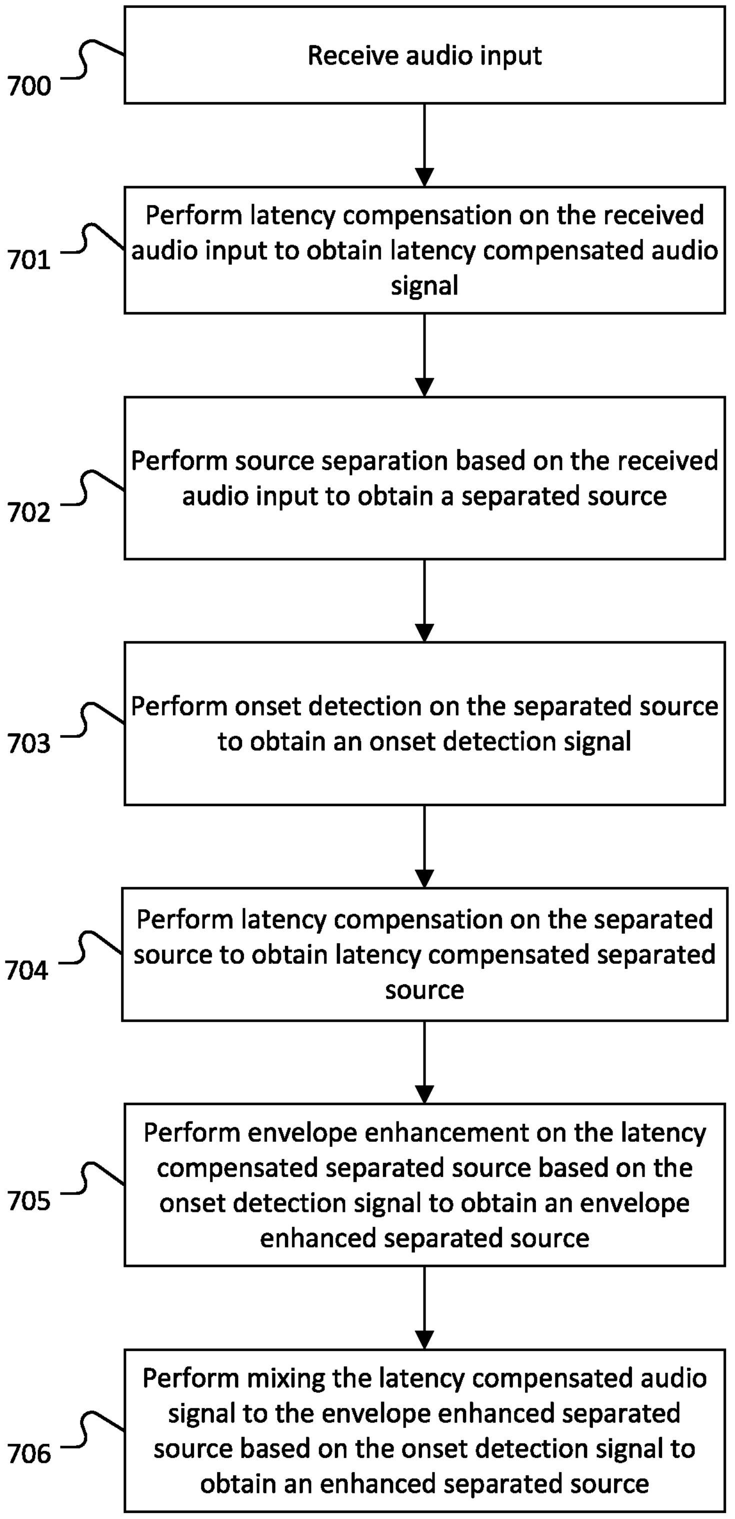
FIG. 7 shows a flow diagram visualizing a method for mixing a latency compensated audio signal to an envelope enhanced separated source based on an onset detection signal to obtain an enhanced separated source.

FIG. 7 shows a flow diagram visualizing a method for mixing a latency compensated audio signal to an envelope enhanced separated source based on an onset detection signal to obtain an enhanced separated source. At 700, the source separation 201 (see FIG. 2 and FIG. 6) receives an audio input. At 701, latency compensation 205 is performed on the received audio input to obtain a latency comic, pensated audio signal (see FIG. 2 and FIG. 6). At 702, source separation 201 is performed based on the received audio input to obtain a separated source (see FIG. 2 and FIG. 6). At 703, onset detection 202 is performed on the separated source, for example drums separation, to obtain an onset detection signal. At 704, latency compensation 203 is performed on the separated source to obtain a latency compensated separated source (see FIG. 2 and FIG. 6). At 705, envelope enhancement 209 is performed on the latency compensated separated source based on the onset detection signal to obtain an envelope enhanced separated source (see FIG. 6). At 705, mixing is performed of the latency compensated audio signal to the envelope enhanced separated source based on the onset detection signal to obtain an enhanced separated source (see FIG. 6).

Figure 8:
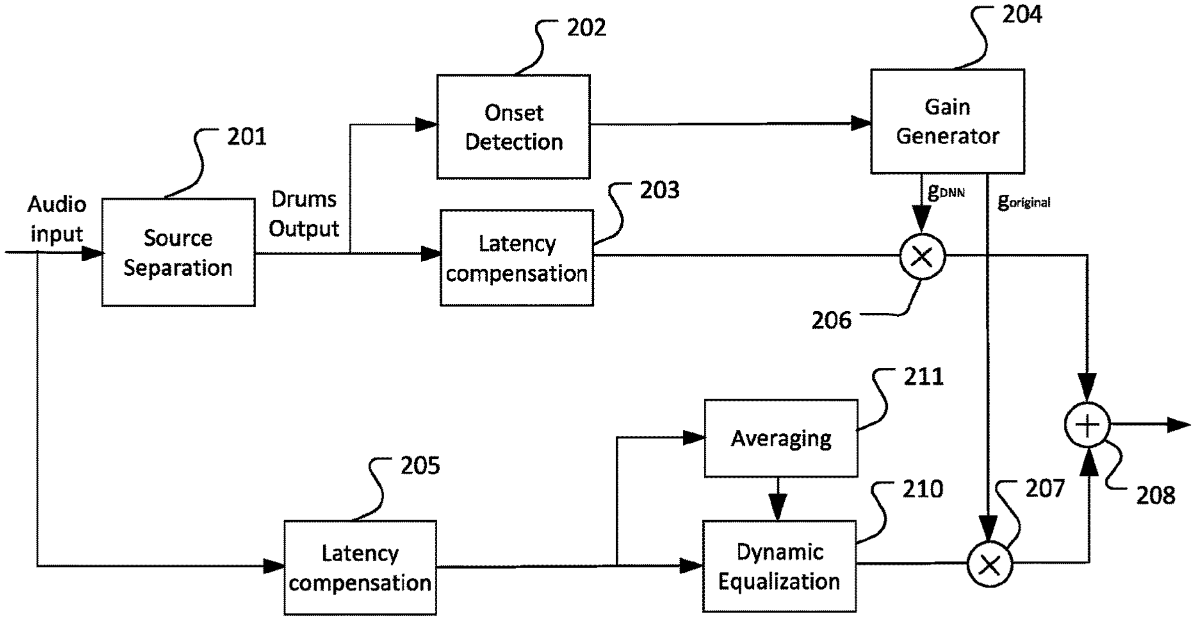
FIG. 8 schematically shows a process of enhancing a separated source based on an onset detection and based on a dynamic equalization related to a rhythm analysis result.

FIG. 8 schematically shows a process of enhancing a separated source based on an onset detection and based on a dynamic equalization related to a rhythm analysis result. The process comprises a source separation 201, an onset detection 202, a latency compensation 203, a gain generator 204, a latency compensation 205, an amplifier 206, an amplifier 207, a mixer 208, an averaging 210 and a dynamic equalization 211. An audio input signal (see input signal 1 in FIG. 1) containing multiple sources (see Source 1, 2, . . . K in FIG. 1), with multiple channels (e.g. $M_{in}$=2), is input to the source separation 201 and decomposed into separations (see separated sources 2*a*-2*d* in FIG. 1) as it is described with regard to FIG. 1 above, and one of the separations is selected, here the drums separation (drums output). The selected separated source (see separated signal 2 in FIG. 1), here drums separation, is transmitted to the onset detection 202. At the onset detection 202, the separated source is analyzed to produce an onset detection signal (see "Onset" in FIG. 3). The onset detection signal indicates the attack phase of a sound (e.g. bass, hi-hat, snare), here the drums. As the analysis of the separated source needs some time, the onset detection 202 will detect the onset later than it really is. That is, there is an expected latency Δt of the onset detection signal. The expected time delay Δt is a known, predefined parameter, which may be set in the latency compensation 203 and 205 as a predefined parameter.

The separated source obtained during source separation 201, here the drums separation, is also transmitted to the latency compensation 203. At the latency compensation 203, the drums separation is delayed by the expected latency Δt of the onset detection signal to generate a latency compensated drums separation. This has the effect that the latency Δt of the onset detection signal is compensated by a respective delay of the drums separation. Simultaneously with the source separation 201, the audio input is transmitted to the latency compensation 205. At the latency compensation 205, the audio input is delayed by the expected latency Δt of the onset detection signal to generate a latency compensated audio signal. This has the effect that the latency Δt of the onset detection signal is compensated by a respective delay of the audio input. The latency compensated audio signal is transmitted to the averaging 210. At the averaging 210, the latency compensated audio signal is analyzed to produce an averaging parameter. The averaging 210 is configured to perform averaging on the latency compensated audio signal to obtain the averaging parameter. The averaging parameter is obtained by averaging several beats of the latency compensated audio signal to get a more stable frequency spectrum of the latency compensation 205 (mix buffer). The process of the averaging 210 will be described in more detail in FIG. 9.

The latency compensated audio signal, obtained during latency compensation 205, is also transmitted to the dynamic equalization 211. At the dynamic equalization 211, the latency compensated audio signal is dynamic equalized based on the averaging parameter, calculated during averaging 210, to obtained dynamic equalized audio signal.

The gain generator 204 is configured to generate a gain $g_{DNN}$ to be applied to the latency compensated separated source and a gain $g_{Original}$ to be applied on the dynamic equalized audio signal based on the onset detection signal. The function of the gain generator 204 is described in more detail in FIG. 3. The amplifier 206 generates, based on the latency compensated drums separation and based on the gain $g_{DNN}$ generated by the gain generator, a gain modified latency compensated drums separation. The amplifier 207 generates, based on the dynamic equalized audio signal and based on the gain $g_{Original}$ generated by the gain generator, a gain modified dynamic equalized audio signal. The mixer 208 mixes the gain modified dynamic equalized audio signal to the gain modified latency compensated drums separation to obtain an enhanced drums separation.

The present invention is not limited to this example. The source separation 201 could output also other separated sources, e.g. vocals separation, bass separation, other separation, or the like. Although in FIG. 2 only one separated source (here the drums separation) is enhanced by onset detection, multiple of the separated sources can be enhanced by the same process. The enhanced separated sources may for example be used in remixing/upmixing (see right side of FIG. 1).

Figure 9:
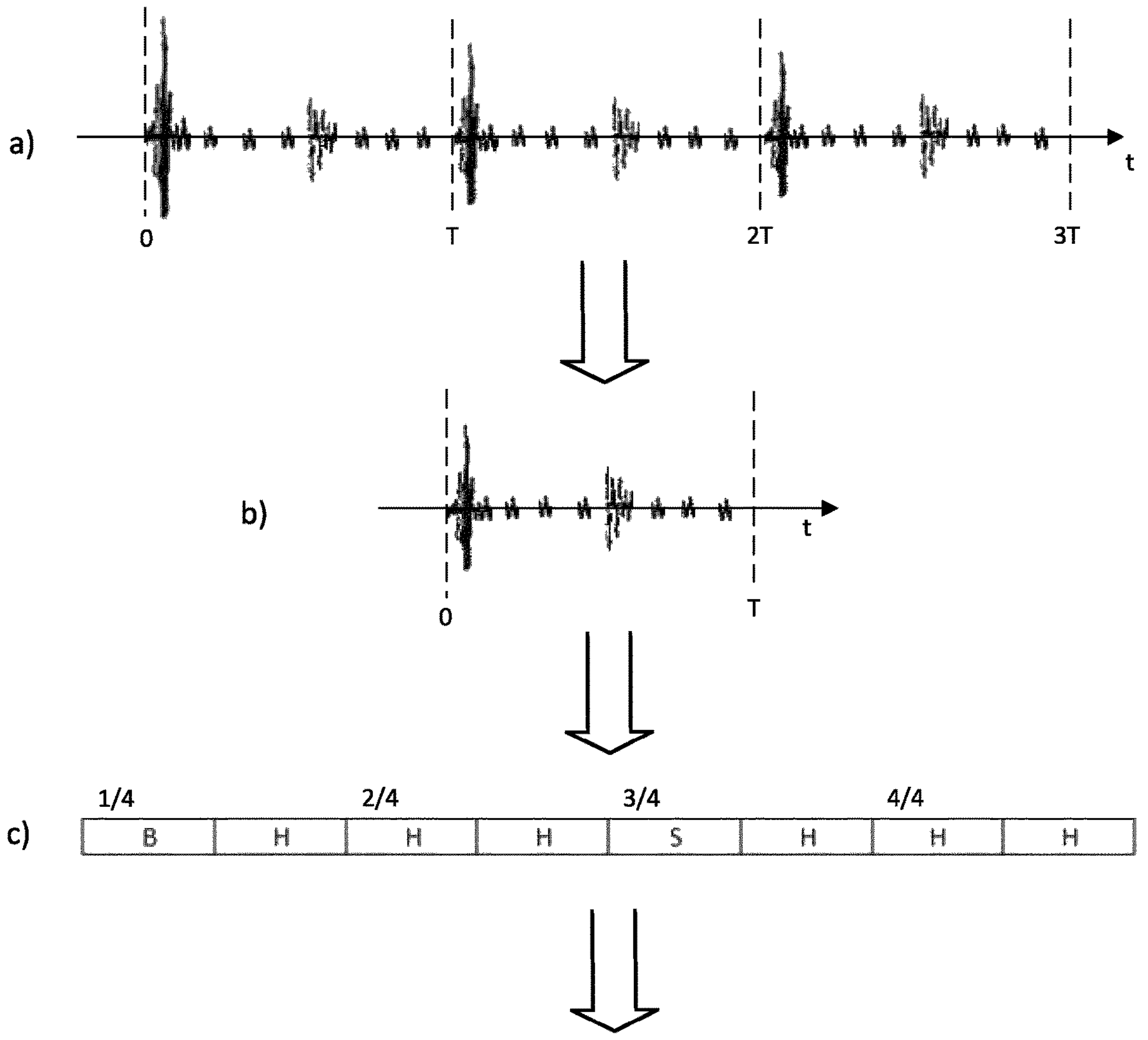
FIG. 9 schematically shows a process of averaging the audio signal to get an average of several beats of an audio signal in order to get a more stable frequency spectrum of the latency compensated audio signal that is mixed to the separated source.

FIG. 9 schematically shows a process of averaging the audio signal to get an average of several beats of an audio signal in order to get a more stable frequency spectrum of the latency compensated audio signal that is mixed to the separated source. Part a) of FIG. 9 shows an audio signal that comprises several beats of length T, wherein each beat comprises several sounds. A first beat starts at time instance 0 and ends at time instance T. A second beat subsequent to the first beat starts at time instance T and ends at time instance 2T. A third beat subsequent to the second beat starts at time instance 2T and ends at time instance 3T.

The averaging 210 (see FIG. 8) which is indicated in FIG. 9 by the arrow between part a) and part b) calculates the average audio signal of the beats. The average audio signal of the beats is displayed in part b) of FIG. 9. A rhythm analyzing process, displayed as the arrow between part b) and part c) analyzes the average audio signal to identify sounds (bass, hit-hat and snare) to obtain a rhythm analysis result which is display in part c) of FIG. 9. The rhythm analysis result comprises eight parts of the beat. The rhythm analysis result identifies a bass sound on the first part (1/4) of the beat, a hi-hat sound on the second part of the beat, a hi-hat sound on the third part (2/4) of the beat, a hi-hat sound on the fourth part of the beat, a snare sound on the fifth part (3/4) of the beat, a hi-hat sound on the sixth part of the beat, a hi-hat sound on the seventh part (4/4) of the beat, and a hi-hat sound on the eighth part of the beat.

Based on the rhythm analysis result, the dynamic equalization (211 in FIG. 8) performs dynamic equalization on the audio signal by changing the low, middle and high frequencies of the bass, hi-hat and snare accordingly. For example, by increasing e.g. +5 dB the low frequencies of the bass and by decreasing e.g. −5 dB the middle frequencies and high frequencies of the bass. In addition, by increasing e.g. +5 dB the high frequencies of the hi-hat and by decreasing e.g. −5 dB the middle frequencies and low frequencies of the hi-hat. Moreover, by increasing e.g. +5 dB the middle frequencies of the snare and by decreasing e.g. −5 dB the low frequencies and high frequencies of the snare. This process results in a dynamic equalized audio signal based on the rhythm analysis process. That is, if a bass drum is played, the dynamic equalization 211 acts as a low pass to suppress the high frequencies of other instruments in the mix. In case of a hi-hat or cymbal, the filter acts as a high pass, suppressing the lower frequencies of the other instruments.

Figure 10:
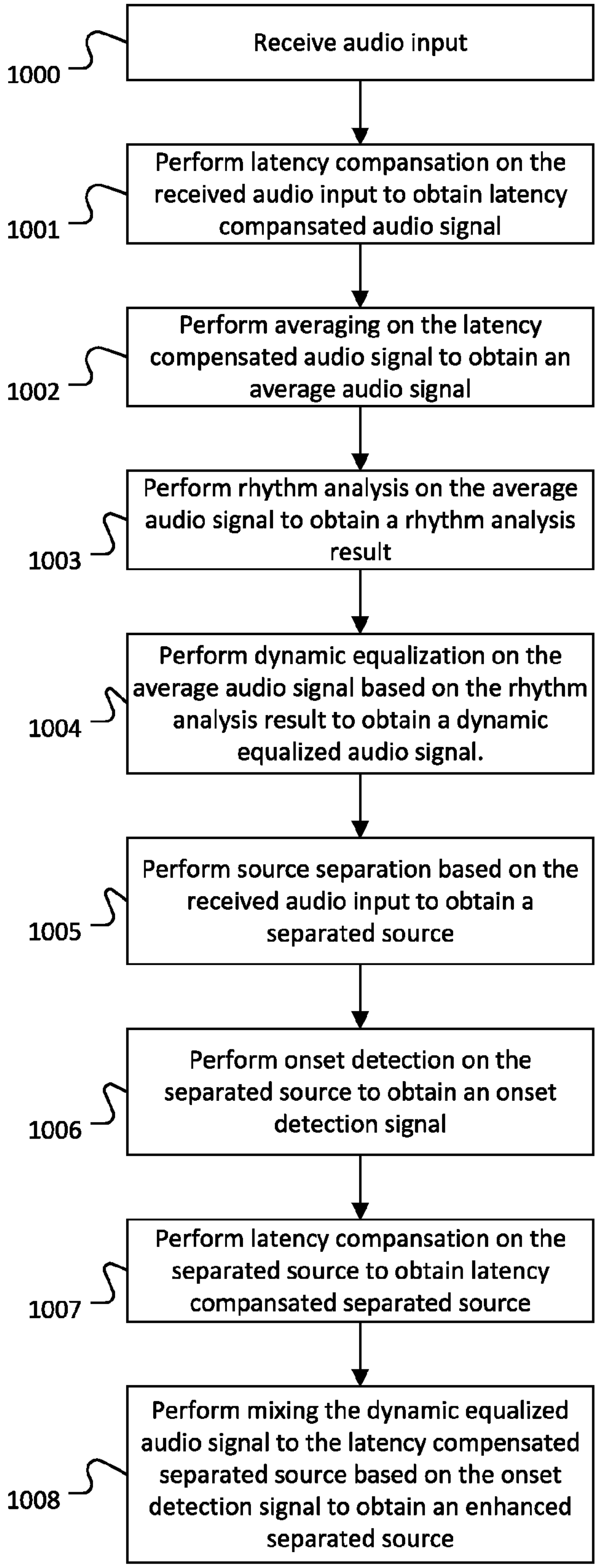
FIG. 10 shows a flow diagram visualizing a method for signal mixing based on dynamic equalization related to an averaging parameter to obtain an enhanced separated source.

FIG. 10 shows a flow diagram visualizing a method for signal mixing based on dynamic equalization related to an averaging parameter to obtain an enhanced separated source. At 1000, the source separation 201 (see FIG. 2 and FIG. 8) receives an audio input. At 1001, latency compensation 205 is performed on the received audio input to obtain a latency compensated audio signal (see FIG. 2 and FIG. 8). At 1002, an averaging 210 is performed on the latency compensated audio signal to obtain an average audio signal. At 1003, rhythm analysis is performed on the average audio signal to obtain a rhythm analysis result. At 1004, dynamic equalization 211 is performed on the average audio signal based on the rhythm analysis result to obtain a dynamic equalized audio signal (see FIG. 8). At 1005, source separation 201 is performed based on the received audio input to obtain a separated source (see FIG. 2 and FIG. 8). At 1006, onset detection 202 is performed on the separated source, for example drums separation, to obtain an onset detection signal. At 1007, latency compensation 203 is performed on the separated source to obtain a latency compensated separated source (see FIG. 2 and FIG. 8). At 1008, mixing is performed of the dynamic equalized audio signal to the latency compensated separated source based on the onset detection signal to obtain an enhanced separated source (see FIG. 8).

Figure 11:
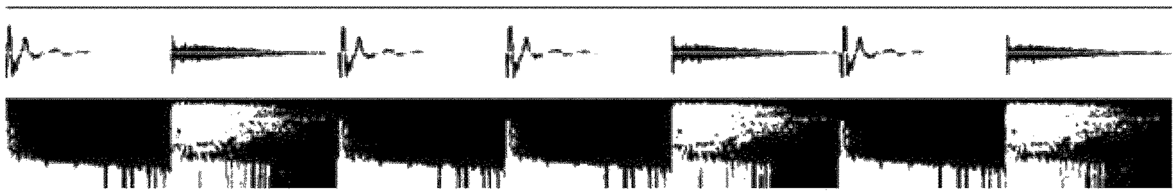
FIG. 11 schematically shows a time representation of a drum loop with bass drum and hi-hat played in a rhythm before dynamic equalization and after dynamic equalization.
Figure 11:
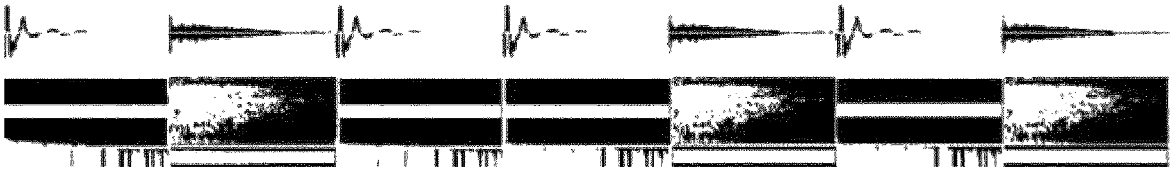

FIG. 11 schematically shows a time representation of a drum loop with bass drum and hi-hat played in a rhythm before dynamic equalization (part a) of FIG. 11) and after dynamic equalization (part b) of FIG. 11). As can be taken from the spectrogram of part a) of FIG. 11, the spectrum of the bass drum contains low and middle frequencies. As can be taken from part b) of FIG. 11, the crosstalk in the high frequencies of the bass drum and the low frequencies of the hi-hat is reduced. The spectrum of the bass drum contains low and middle frequencies. The dynamic equalization (211 in FIG. 8 and the corresponding description) acts as a low pass in this section and at the hi-hat area it has a high pass characteristic. This results to a minimized spectral crosstalk when the gain generator (204 in FIG. 8) mixes the dynamic equalized audio signal (original signal) to the separated source (separation output). That has the effect that the crosstalk is limited in unwanted frequency bands. The dynamic equalization acts as a filter, which learns the rhythm of the music to determine the type of, played instrument.

Figure 12:
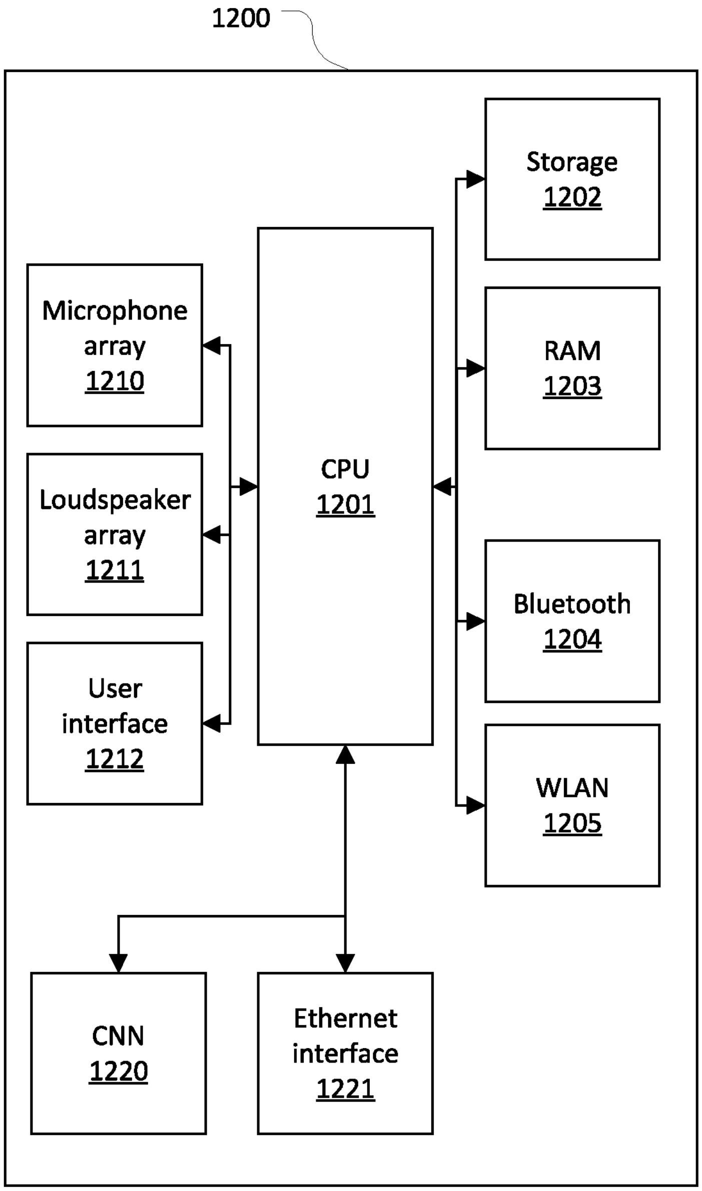
FIG. 12 schematically describes an embodiment of an electronic device that can implement the processes of mixing based on an onset detection.

FIG. 12 schematically describes an embodiment of an electronic device that can implement the processes of mixing based on an onset detection, as described above. The electronic device 1200 comprises a CPU 1201 as processor. The electronic device 1200 further comprises a microphone array 1210, a loudspeaker array 1211 and a convolutional neural network unit 1220 that are connected to the processor 1201. Processor 1201 may for example implement a source separation 201, an onset detection 203, a gain generator 204 and/or a latency compensation 203 and 205 that realize the processes described with regard to FIG. 2, FIG. 6 and FIG. 8 in more detail. The CNN unit may for example be an artificial neural network in hardware, e.g. a neural network on GPUs or any other hardware specialized for the purpose of implementing an artificial neural network. Loudspeaker array 1211 consists of one or more loudspeakers that are distributed over a predefined space and is configured to render 3D audio. The electronic device 1200 further comprises a user interface 1212 that is connected to the processor 1201. This user interface 1212 acts as a man-machine interface and enables a dialogue between an administrator and the electronic system. For example, an administrator may make configurations to the system using this user interface 1212. The electronic device 1200 further comprises an Ethernet interface 1221, a Bluetooth interface 1204, and a WLAN interface 1205. These units 1204, 1205 act as I/O interfaces for data communication with external devices. For example, additional loudspeakers, microphones, and video cameras with Ethernet, WLAN or Bluetooth connection may be coupled to the processor 1201 via these interfaces 1221, 1204, and 1205.

The electronic system 1200 further comprises a data storage 1202 and a data memory 1203 (here a RAM). The data memory 1203 is arranged to temporarily store or cache data or computer instructions for processing by the processor 1201. The data storage 1202 is arranged as a long term storage, e.g. for recording sensor data obtained from the microphone array 1210 and provided to or retrieved from the CNN unit 1220. The data storage 1202 may also store audio data that represents audio messages, which the public announcement system may transport to people moving in the predefined space.

It should be noted that the description above is only an example configuration. Alternative configurations may be implemented with additional or other sensors, storage devices, interfaces, or the like.

It should be recognized that the embodiments describe methods with an exemplary ordering of method steps. The specific ordering of method steps is, however, given for illustrative purposes only and should not be construed as binding.

It should also be noted that the division of the electronic system of FIG. 12 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

The invention claimed is:

1. An electronic device comprising circuitry configured to:

perform source separation based on a received audio input to obtain a separated source;

perform onset detection on the separated source to obtain a binary onset detection signal that indicates only an onset of sound in the separated source; and mix the received audio input with the separated source based on the onset detection signal to obtain an enhanced audio signal.

2. The electronic device of claim 1, wherein the circuitry is further configured to:

perform latency compensation based on the received audio input to obtain a latency compensated audio signal; and perform latency compensation on the separated source to obtain a latency compensated separated source.

3. The electronic device of claim 2, wherein the mixing of the audio signal with the separated source based on the onset detection signal comprises mixing the latency compensated audio signal with the latency compensated separated source.

4. The electronic device of claim 2, wherein the circuitry is further configured to:

generate a gain $g_{DNN}$ to be applied to the latency compensated separated source based on the onset detection signal; and generate a gain $g_{Original}$ to be applied to the latency compensated audio signal based on the onset detection signal.

5. The electronic device of claim 2, wherein the circuitry is further configured to:

generate a gain modified latency compensated separated source based on the latency compensated separated source; and generate a gain modified latency compensated audio signal based on the latency compensated audio signal.

6. The electronic device of claim 2, wherein performing latency compensation on the separated source comprises delaying the separated source by an expected latency in the onset detection.

7. The electronic device of claim 2, wherein performing compensation on the received audio input comprises delaying the received audio input by an expected latency in the onset detection.

8. The electronic device of claim 2, wherein the circuitry is further configured to perform an envelope enhancement on the latency compensated separated source to obtain an envelope enhanced separated source.

9. The electronic device of claim 8, wherein the mixing of the audio signal with the separated source comprises mixing the latency compensated audio signal with the envelope enhanced separated source.

10. The electronic device of claim 2, wherein the circuitry is further configured to perform averaging on the latency compensated audio signal to obtain an average audio signal.

11. The electronic device of claim 10, wherein the circuitry is further configured to perform a rhythm analysis on the average audio signal to obtain a rhythm analysis result.

12. The electronic device of claim 11, wherein the circuitry is further configured to perform dynamic equalization on the latency compensated audio signal and on the rhythm analysis result to obtain a dynamic equalized audio signal.

13. The electronic device of claim 12, wherein the mixing of the audio signal with the separated source comprises mixing the dynamic equalized audio signal with the latency compensated separated source.

14. A method comprising:

performing source separation based on a received audio input to obtain a separated source;

performing onset detection on the separated source to obtain a binary onset detection signal that indicates only an onset of sound in the separated source; and mixing the received audio input with the separated source based on the onset detection signal to obtain an enhanced separated source.

15. A non-transitory computer-readable medium storing a computer program comprising instructions that, when executed by a processor, case the processor to perform a method comprising:

performing source separation based on a received audio input to obtain a separated source;

performing onset detection on the separated source to obtain a binary onset detection signal that indicates only an onset of sound in the separated source; and mixing the received audio input with the separated source based on the onset detection signal to obtain an enhanced separated source.

16. The electronic device of claim 1, wherein the onset detection is performed through time-domain analysis of the separated source.

17. The electronic device according to claim 1, wherein the onset detection on the separated source is performed by pattern recognition through machine learning.

18. The electronic device of claim 1, wherein the onset detection is performed by at least one of frequency domain analysis and phase domain analysis on the separated source.

19. The electronic device of claim 18, wherein the onset detection is performed through identification of changes in spectral energy in the separated source.

20. The electronic device of claim 18, wherein the onset detection is performed through analysis of phase changes in the separated source.

* * * * *